(12) United States Patent
Lassen et al.

(10) Patent No.: US 7,258,152 B2
(45) Date of Patent: Aug. 21, 2007

(54) MASTER PROCESSING APPARATUS

(75) Inventors: Morten Lassen, Scottsdale, AZ (US); Lisa Causse, Phoenix, AZ (US); Joon Park, Mesa, AZ (US)

(73) Assignee: Xyron, Inc., Scottsdale, AZ (US)

( * ) Notice: Subject to any disclaimer, the term of this patent is extended or adjusted under 35 U.S.C. 154(b) by 569 days.

(21) Appl. No.: 10/760,528

(22) Filed: Jan. 21, 2004

(65) Prior Publication Data

US 2005/0167045 A1 Aug. 4, 2005

Related U.S. Application Data

(60) Provisional application No. 60/441,107, filed on Jan. 21, 2003.

(51) Int. Cl.
*B32B 37/18* (2006.01)

(52) U.S. Cl. .................. 156/539; 156/538; 156/555; 156/556

(58) Field of Classification Search ............. None
See application file for complete search history.

(56) References Cited

U.S. PATENT DOCUMENTS

| | | |
|---|---|---|
| 5,580,417 A | 12/1996 | Bradshaw |
| 5,584,962 A | 12/1996 | Bradshaw et al. |
| 5,735,998 A | 4/1998 | Bradshaw |
| 5,788,806 A | 8/1998 | Bradshaw et al. |
| 5,853,531 A | 12/1998 | Murphy et al. |
| 5,961,779 A | 10/1999 | Bradshaw |
| 6,244,322 B1 | 6/2001 | Paque |
| 6,270,612 B1 | 8/2001 | Bradshaw |
| RE37,345 E | 9/2001 | Bradshaw et al. |
| D451,959 S | 12/2001 | Velasquez |
| 6,335,067 B1 | 1/2002 | O'Keefe et al. |
| RE37,758 E | 6/2002 | Bradshaw et al. |
| 6,403,185 B1 | 6/2002 | Neuburger et al. |
| 6,422,281 B1 | 7/2002 | Ensign, Jr. et al. |
| 6,527,028 B2 | 3/2003 | Miller |
| 6,539,997 B1 | 4/2003 | Lemens |
| 6,576,080 B1 | 6/2003 | Velasquez et al. |
| 6,602,376 B1 | 8/2003 | Bradshaw |
| 6,660,120 B2 | 12/2003 | Neuburger et al. |
| 6,672,354 B2 | 1/2004 | Lemens et al. |
| 6,675,854 B2 | 1/2004 | Worth |
| 6,675,855 B1 | 1/2004 | Lemens |
| 2001/0042590 A1 | 11/2001 | Neuburger |
| 2001/0054486 A1* | 12/2001 | Botta .................... 156/555 |
| 2002/0179222 A1 | 12/2002 | Velasquez et al. |

FOREIGN PATENT DOCUMENTS

| | | |
|---|---|---|
| WO | 96/32256 | 10/1996 |
| WO | 99/07802 | 2/1999 |

* cited by examiner

*Primary Examiner*—Jessica Ward
(74) *Attorney, Agent, or Firm*—Pillsbury Winthrop Shaw Pittman LLP

(57) ABSTRACT

A master processing apparatus for performing a master processing operation on a target substrate includes a frame, a supply, and a processor. The supply includes a plurality of pouches. The pouch holder enables the pouches to be successively exposed as a leading pouch in an operative position wherein one of the sheets of the leading pouch can be unfolded away from the other sheet to open the leading pouch into an open position for receipt of the target substrate.

33 Claims, 14 Drawing Sheets

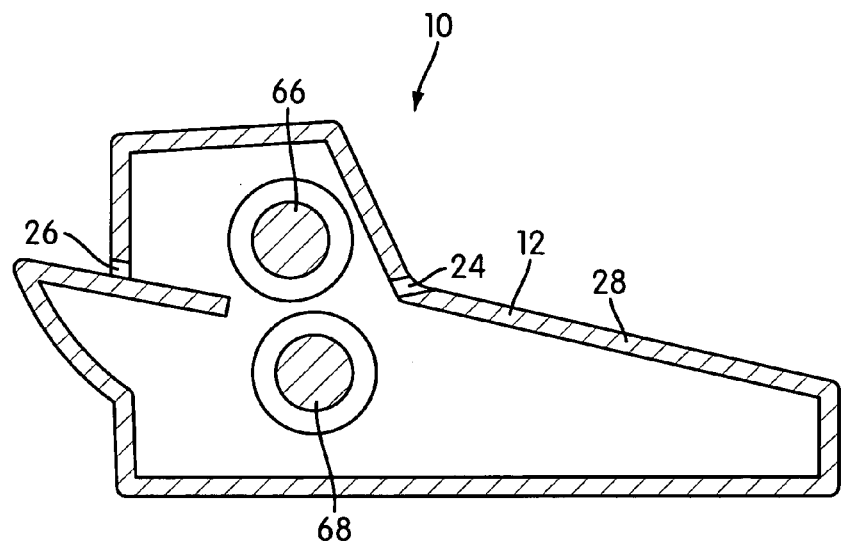
FIG. 16
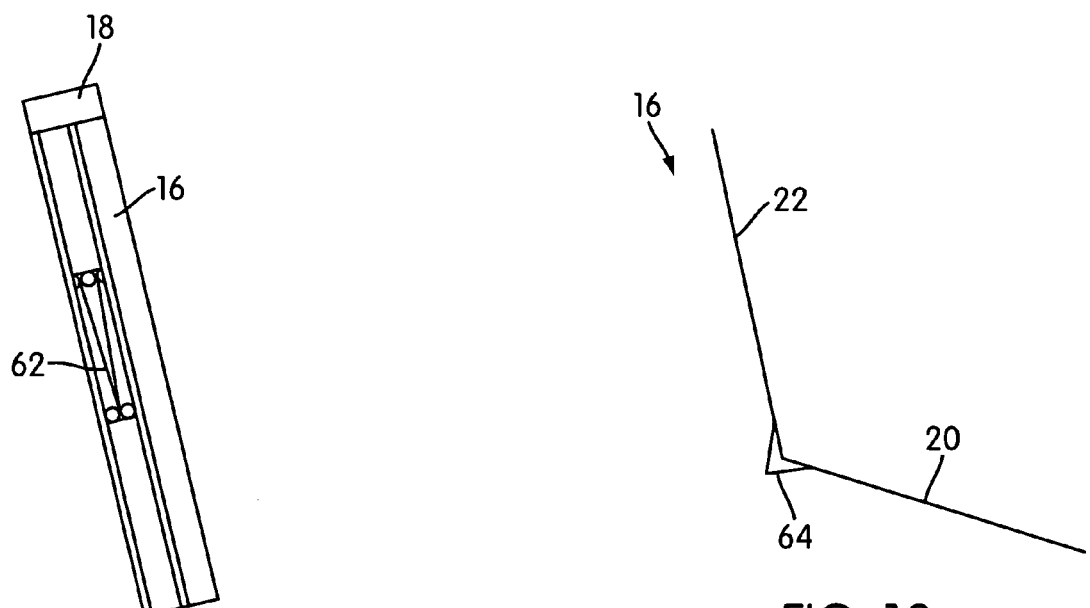
FIG. 17
FIG. 18

MASTER PROCESSING APPARATUS

The present application claims priority to U.S. Provisional Patent Application 60/441,107 filed Jan. 21, 2003, the contents of which are incorporated herein in their entirety.

FIELD OF THE INVENTION

The present invention relates to a master processing apparatus for performing a master processing operation on a target substrate.

BACKGROUND OF THE INVENTION

Master processing apparatuses for performing master processing operations, such as laminating, adhesive transfer, magnet making and other such operations are known in the art. Some of these apparatuses use a pair of feed rolls containing wound supplies of stock materials, which may be mounted individually to the apparatus frame, as is shown in U.S. Pat. No. 5,584,962, or which may be mounted together to the apparatus frame by a cartridge, as is shown in U.S. Pat. No. 5,580,417 (each of these patents are hereby incorporated into the present application by reference). Other types of apparatuses use pouches made of a piece of stock material folded in half. These pouches are typically used for laminating, and are used by placing the target substrate between the pouch halves and then feeding the pouch individually into the apparatus for application of pressure and/or heat.

On one hand, pouches have the advantage of coming in predetermined sizes and can avoid the need for cutting and trimming after the processing operation. On the other hand, cartridge type and individual feed roll type apparatuses have the advantages of the ease of mounting the supplies and avoiding the need for feeding individual pouches into the apparatus for each operation.

The present invention endeavors to provide a solution combining the advantages of using pouches and of using a cartridge together.

SUMMARY OF THE INVENTION

One aspect of the present invention provides a master processing apparatus for performing a master processing operation on a target substrate. The apparatus includes a frame, a pouch holder mounted to the frame, a supply, and a processor. The supply includes a plurality of pouches arranged in the pouch holder. Each pouch includes a pair of sheets joined at leading ends thereof and adhesive provided on an inner surface of at least one of the sheets. The pouch holder enables the pouches of the supply to be successively exposed as a leading pouch in an operative position wherein one of the sheets of the leading pouch can be unfolded away from the other sheet to open the leading pouch into an open position for receipt of the target substrate. The processor is operable to perform a processing operation wherein adhesive bonding is affected between the sheets of the leading pouch and the target substrate received therein as they are moved through the processor in a feeding direction.

Another aspect of the present invention provides a method for performing a master processing operation on a target substrate using a master processing apparatus. The method comprises: providing a supply including a plurality of pouches on a frame of the apparatus with a leading one of the pouches in an operative position, each pouch including a pair of sheets joined at leading ends thereof and adhesive provided on an inner surface of at least one of the sheets; unfolding one of the sheets of the leading pouch in the operative position away from the other sheet to open the leading pouch into an open position for receipt of the target substrate; positioning the target substrate on the other sheet; and advancing the leading pouch and the target substrate received therein through a processor to perform a processing operation wherein adhesive bonding is affected between the sheets of the leading pouch and the target substrate.

Still another aspect of the present invention provides a supply for a master processing apparatus operable to affect adhesive bonding between sheets of a pouch to a target substrate. The apparatus includes a frame and a processor operable to perform a processing operation wherein adhesive bonding is affected between the sheets of a pouch and a target substrate received therein as they are moved through the processor in a feeding direction. The supply comprises a pouch holder constructed to be removably mounted to the frame of the apparatus, and a plurality of pouches arranged in the pouch holder. Each pouch includes a pair of sheets joined at leading ends thereof and adhesive provided on an inner surface of at least one of the sheets. The pouch holder when removably mounted to the frame enables the pouches to be successively exposed as a leading pouch in an operative position wherein one of the sheets of the leading pouch cam be unfolded away from the other sheet to open the leading pouch into an open position for receipt of the target substrate, and thereafter the leading pouch with the target substrate can be fed into the processor for performance of the processing operation.

Other aspects, features and advantages of this invention will become apparent from the following detailed description when taken in conjunction with the accompanying drawings, which are a part of this disclosure and which illustrate, by way of example, principles of this invention.

BRIEF DESCRIPTION OF THE DRAWINGS

The accompanying drawings facilitate an understanding of the various embodiments of this invention. In such drawings:

FIG. 16 is a partial cross-sectional view of the apparatus shown in FIG. 1;

FIG. 17 is a partial cross-sectional view of an embodiment of a feeder for advancing the stack of pouches within a cartridge; and FIG. 18 is a side view of an embodiment of an unfolding mechanism that causes one sheet of the pouch to unfold away from the other sheet of the pouch.

DETAILED DESCRIPTION OF ILLUSTRATED EMBODIMENTS

Figure 1:
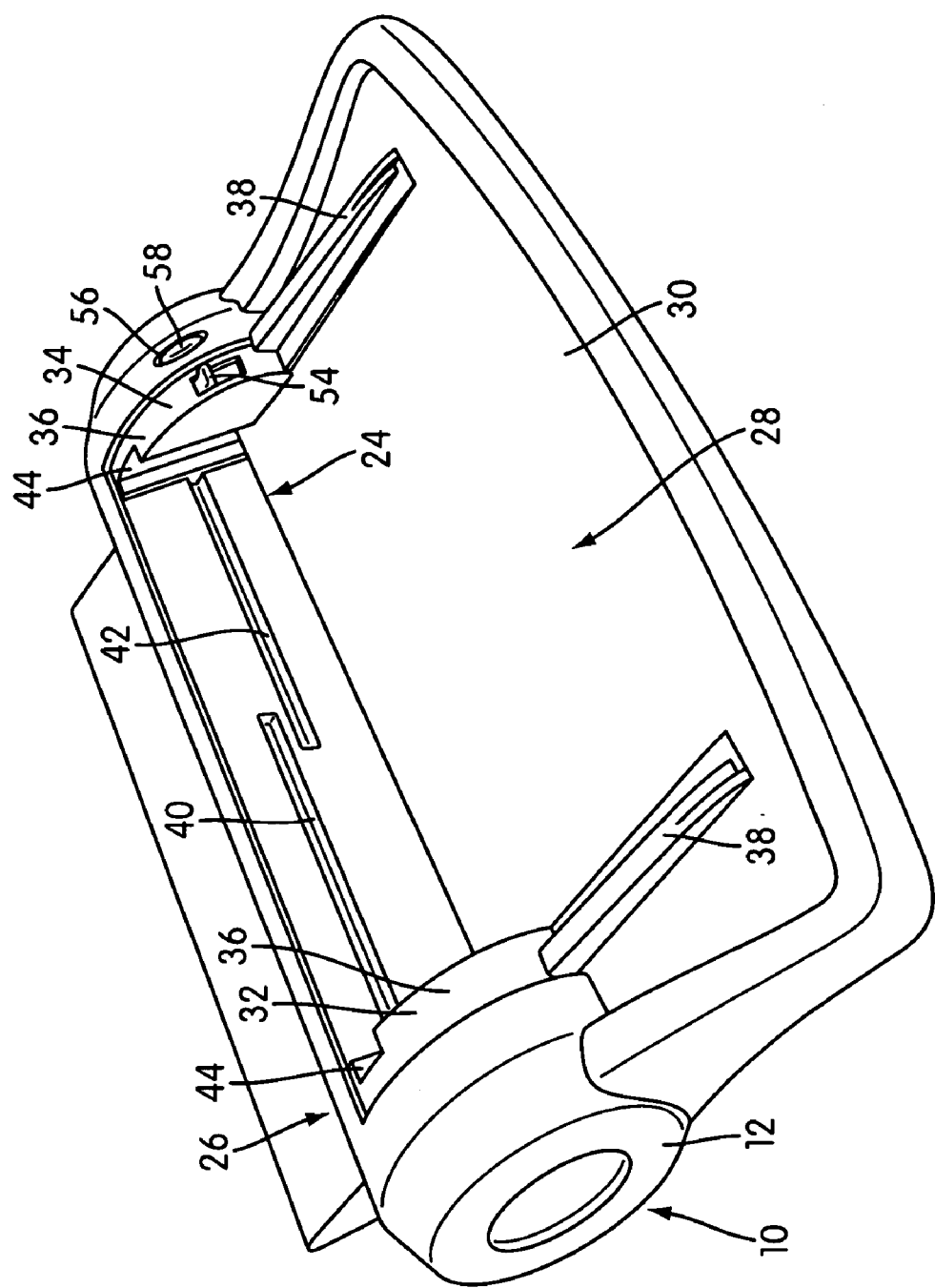
FIG. 1 is a left perspective view of an embodiment of a master processing apparatus constructed in accordance with the principles of the present invention.

FIGS. 1-10 show one embodiment of a master processing apparatus 10 for performing a master processing operation on a target substrate S. The target substrate S may be any type of substrate desired to be processed, including, but not limited to, photographs, business cards, brochures, articles, drawings, computer printouts, etc. In the illustrated embodiment, the apparatus 10 is of a desktop size that can be conveniently positioned on a desk or table, for example. However, the apparatus 10 can be of any suitable size.

In the illustrated embodiment, the master processing apparatus 10 is structured for use as a laminating apparatus for laminating a target substrate. However, other variations of master processing operations may be performed with the apparatus, as will be described in greater detail below.

As shown in FIGS. 5-10, the apparatus 10 includes a frame 12, a supply 14 including a plurality of laminating pouches 16 arranged in a stack, and a processor within the frame 12, which may be in the form of conventional nip rollers 66, 68, as shown in FIG. 16. In the illustrated embodiment, the supply 14 includes a cartridge 18 removably mounted to the frame 12 and containing the stack of laminating pouches 16. The cartridge 18 is removable to enable replacement thereof, as will be further discussed below. However, any type of pouch holder may be used instead of the removable cartridge 18. For example, a pouch holder fixed on the frame for receiving the supply 14 could be used.

Figure 12:
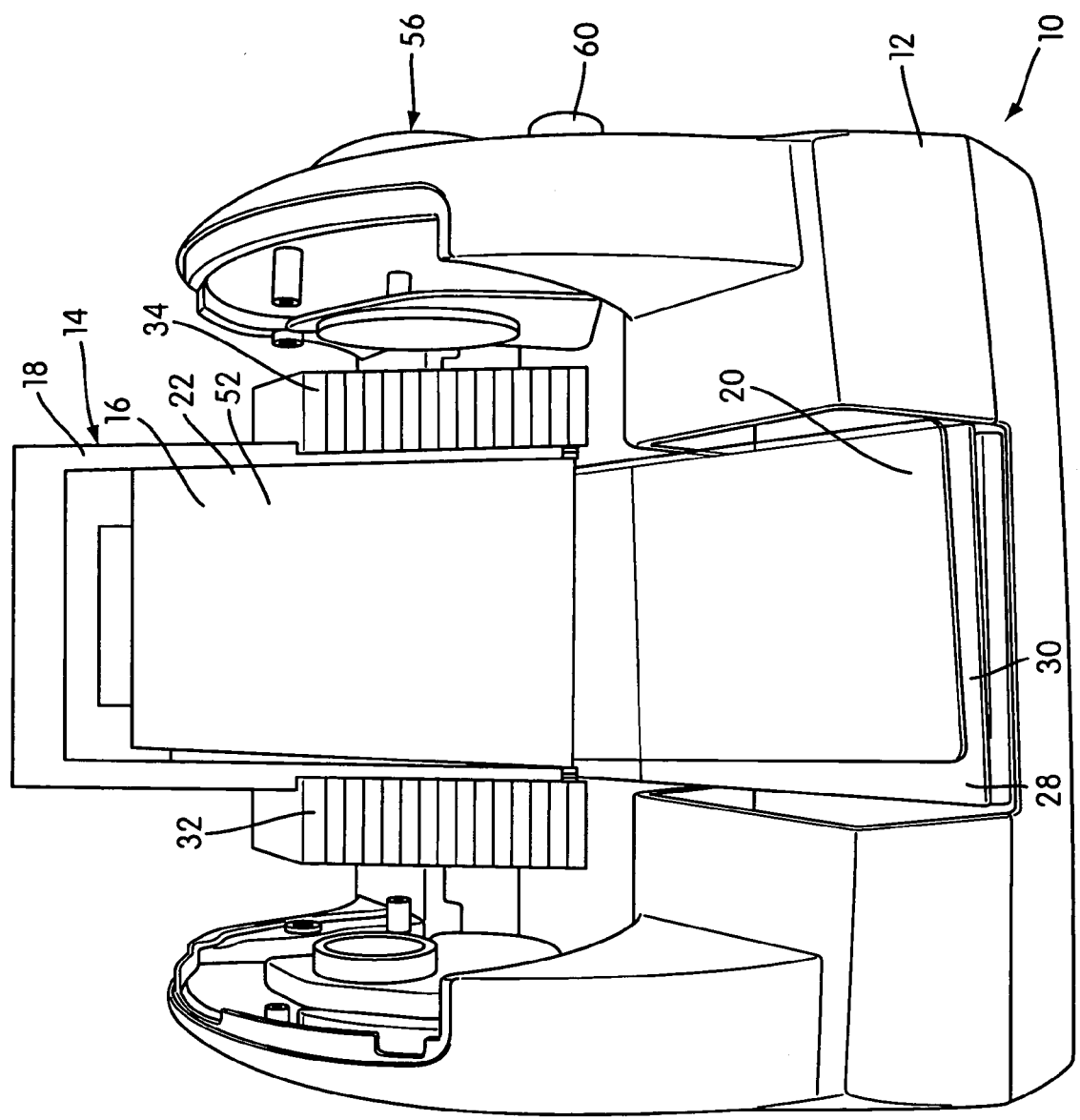
FIG. 12 is a front perspective view illustrating-the apparatus shown in FIG. 11 with the cartridge mounted to the cartridge holders, one of the sheets of the leading pouch being unfolded away from the other sheet to open the leading pouch into an open position for receipt of a target substrate.
Figure 13:
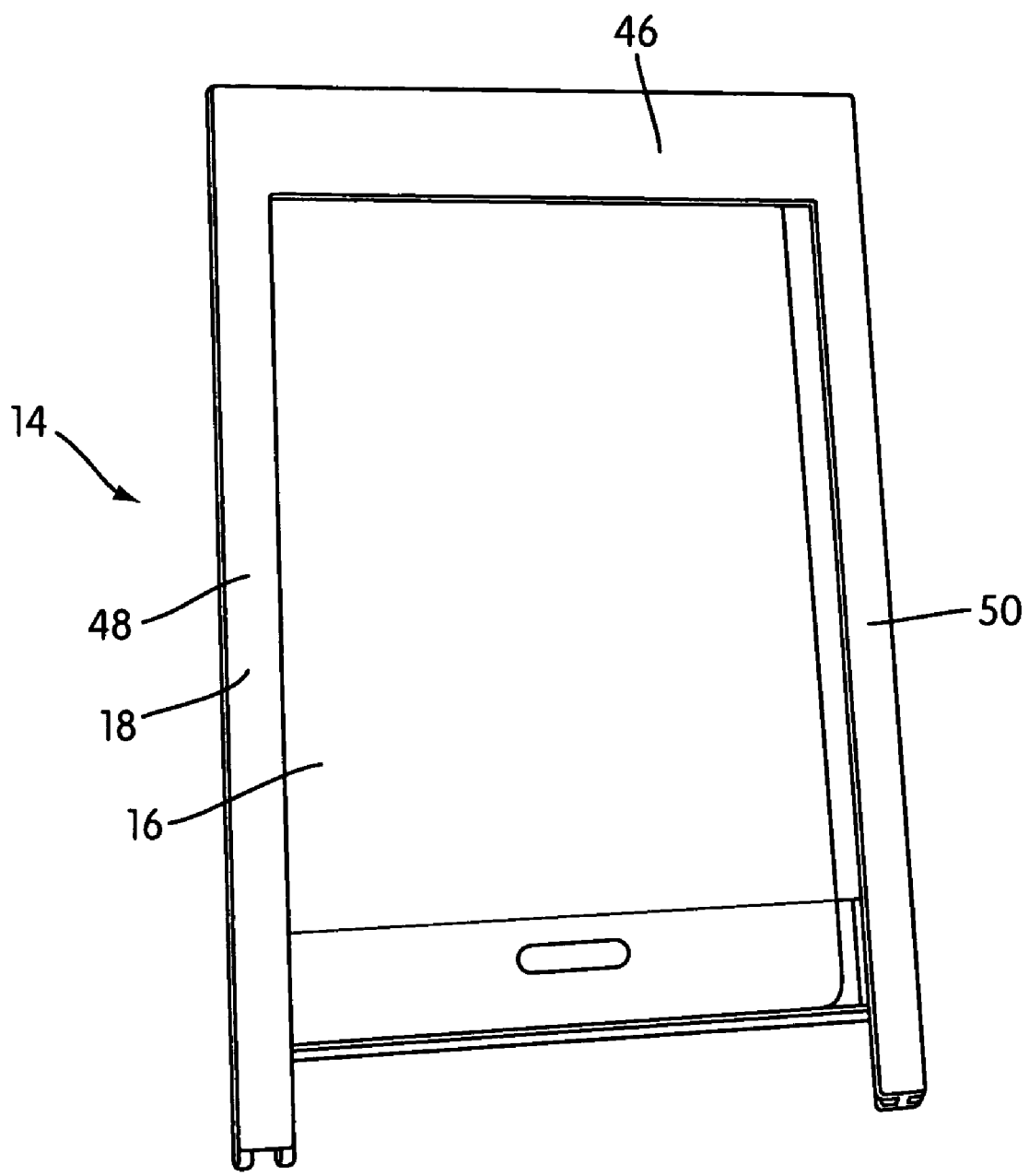
FIG. 13 is a front perspective view of an embodiment of a cartridge containing a stack of pouches.
Figure 14:
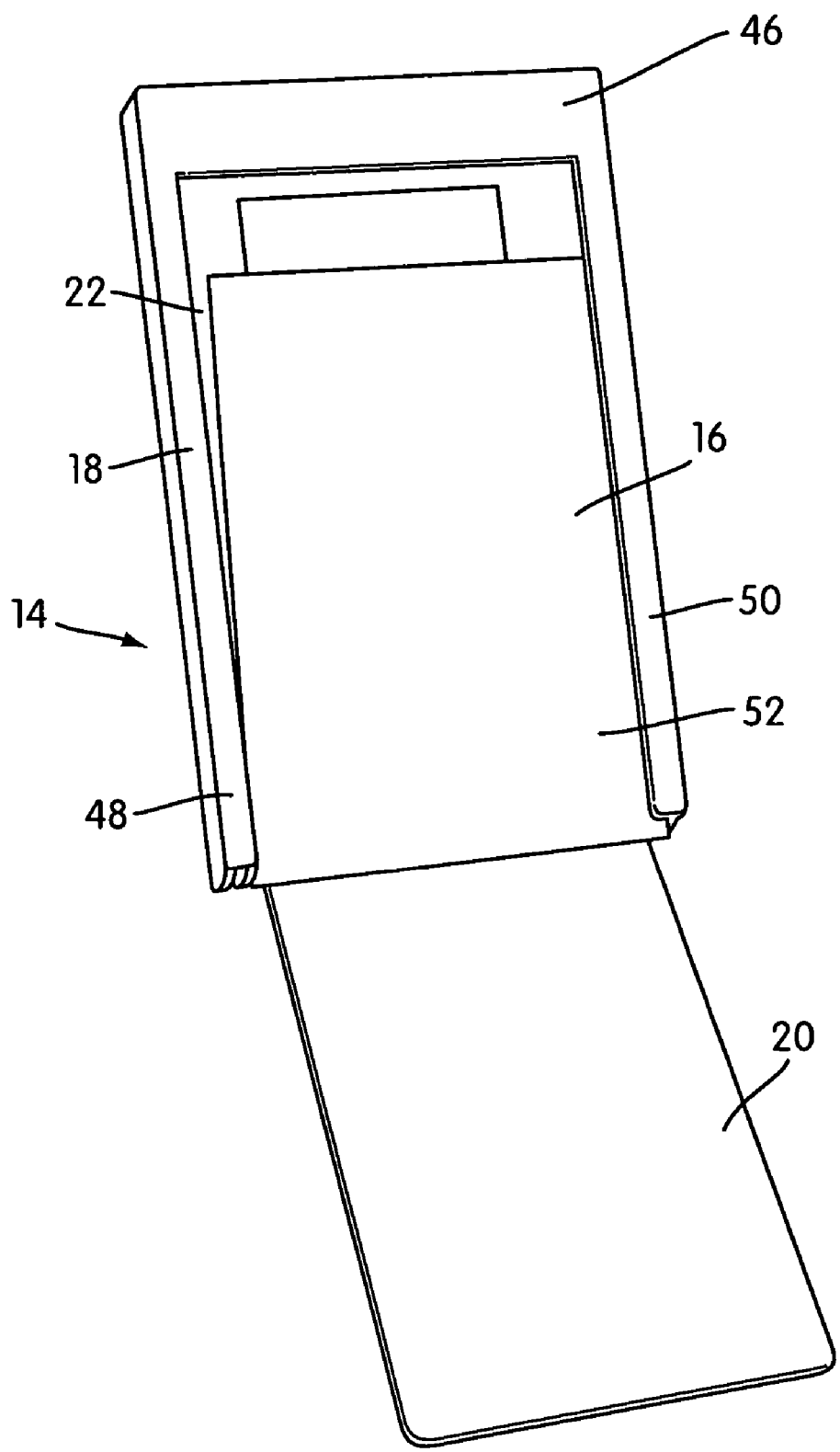
FIG. 14 is a perspective view illustrating the cartridge shown in FIG. 13 with one of the sheets of a leading pouch unfolded away from the other sheet.
Figure 15:
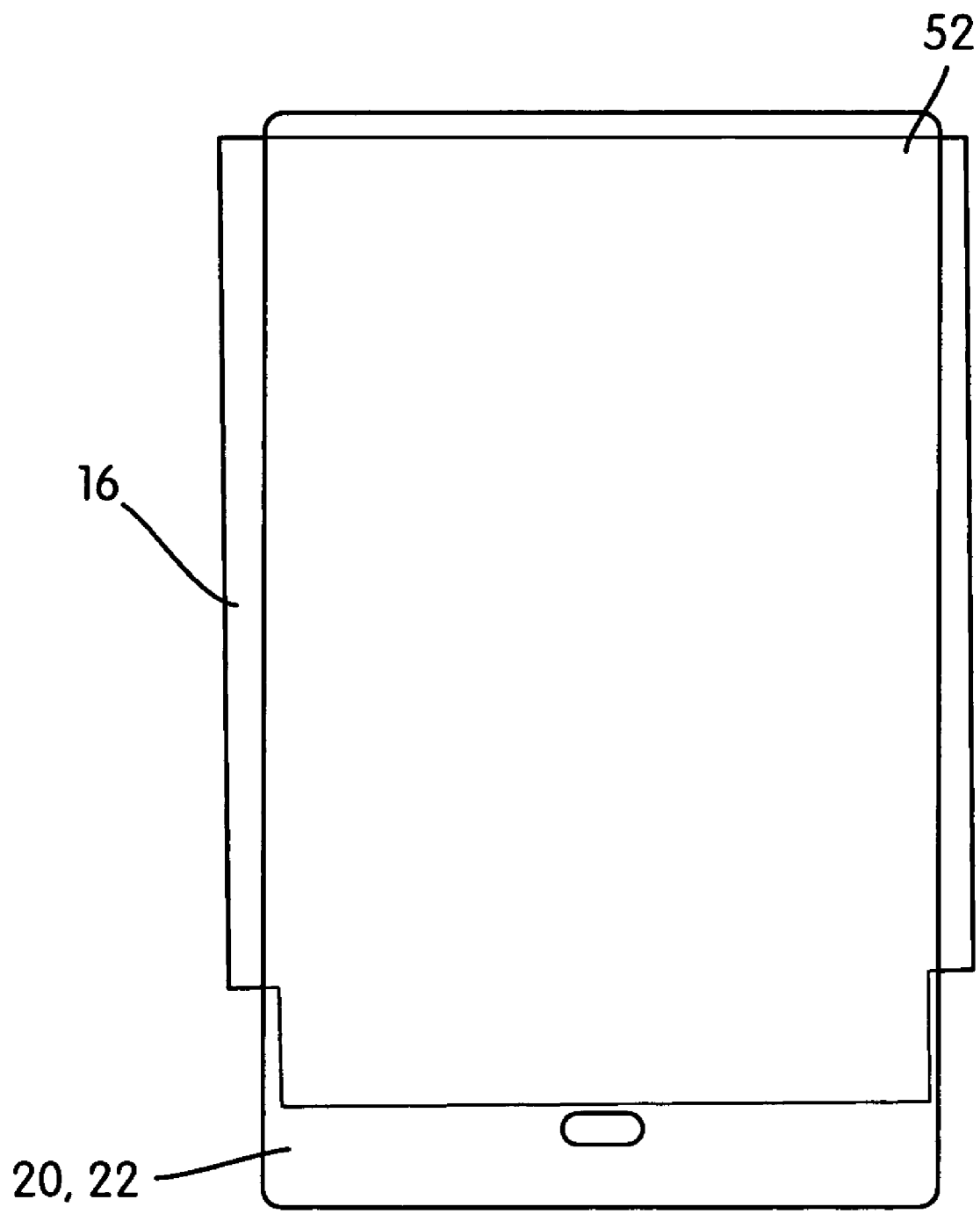
FIG. 15 is a front view of an embodiment of a pouch illustrating a release liner between the sheets of the pouch.

As shown in FIGS. 13-15, each pouch 16 includes a pair of laminating sheets 20, 22 joined at leading ends thereof and an adhesive provided on an inner surface of at least one, and preferably both, of the laminating sheets 20, 22. The sheets 20, 22 could be separate sheets bonded together at their lead ends, or could be defined by folding one sheet with the lead ends being joined by the fold. The cartridge 18 is mounted to the frame 12 with the leading one of the pouches 16 (i.e., the pouch 16 that is next in line for laminating) being positioned in an operative or ready position to enable one of the sheets 20 of the leading pouch 16 to be unfolded away from the other sheet 22 to open the leading pouch 16 into an open position for receipt of the target substrate S (see FIGS. 5, 7, and 12). The processor is operable to perform a processing operation wherein adhesive bonding is affected between the sheets 20, 22 of the leading laminating pouch 16 and the target substrate S received therein as they are moved through the processor in a feeding direction. As each leading pouch is processed, the next or successive one in the stack can be moved successively into the ready position.

Figure 3:
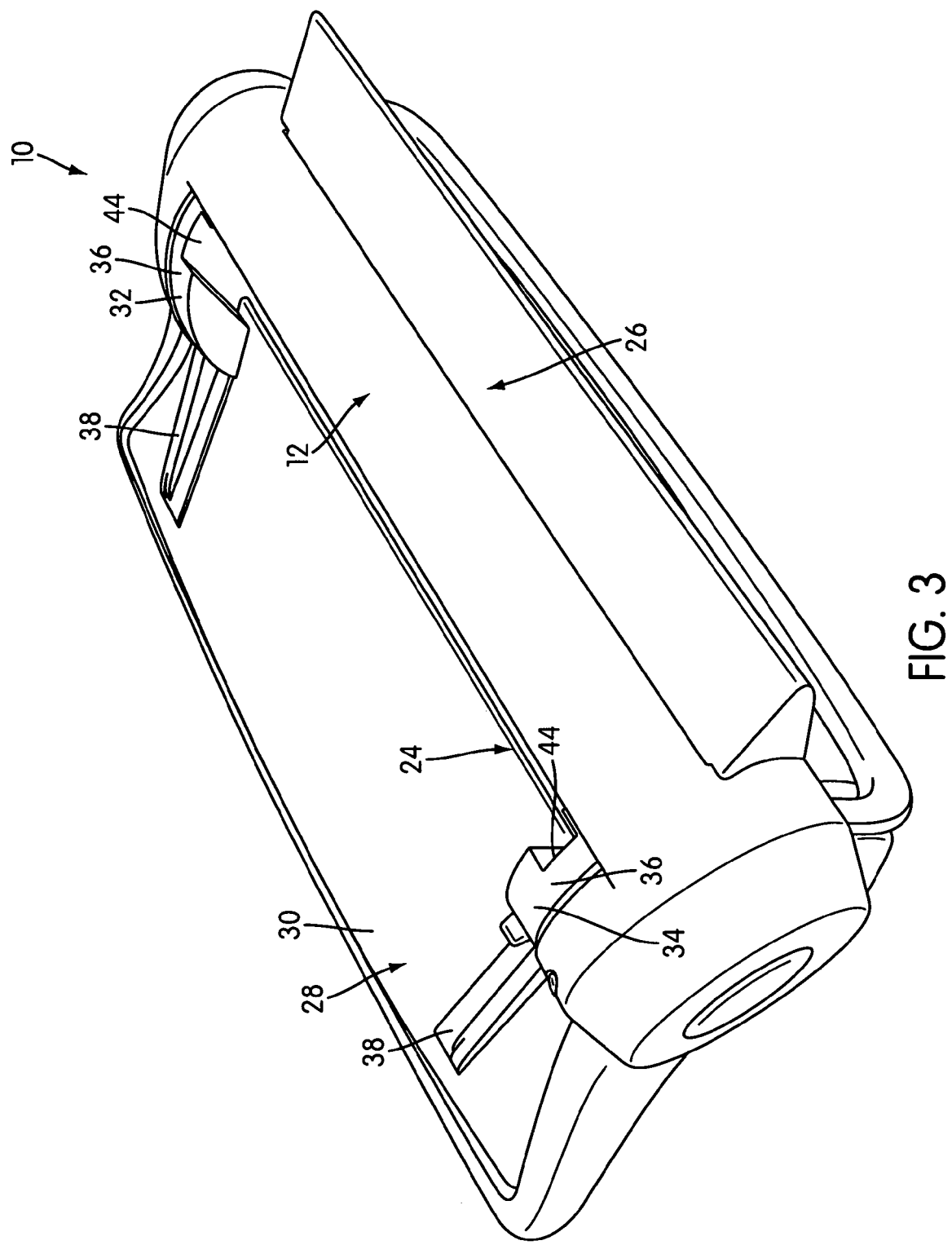
FIG. 3 is a rear perspective view of the apparatus shown in FIG. 1.
Figure 4:
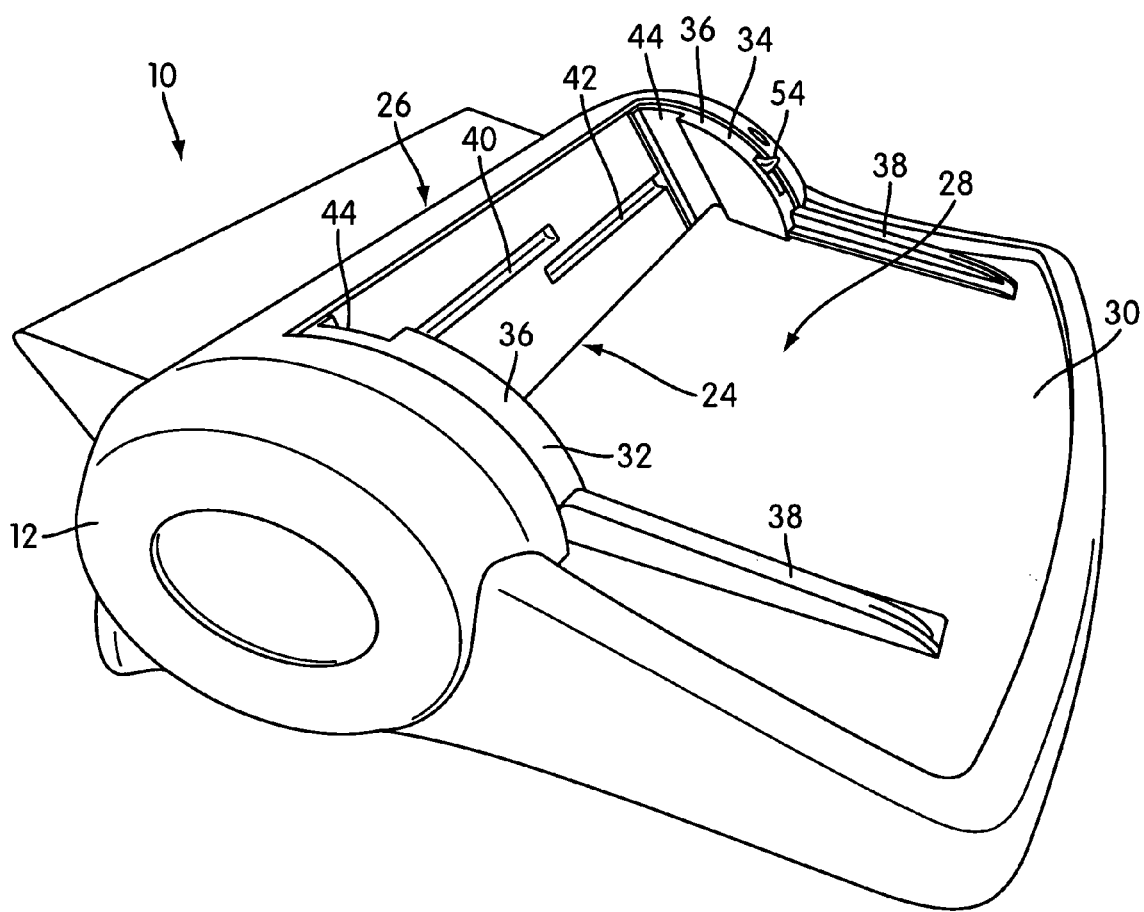
FIG. 4 is a side view of the apparatus shown in FIG. 1.

More specifically, the frame 12 includes a feed opening 24 and an exit or discharge opening 26, as best shown in FIGS. 3 and 4. An input or feed tray 28 having an input tray surface 30 is provided on the frame 12 adjacent the feed opening 24. The input tray surface 30 is positioned to support the one sheet 20 of the leading pouch 16 when unfolded into the open position of the leading pouch 16 as well as the target substrate S when engaged with the one sheet 20 of the leading pouch 16. In the illustrated embodiment, the input tray surface 30 is angled with respect to the feed opening 24 to facilitate the unfolding of the one sheet 20 of the leading pouch 16 into the open position, as will be further discussed. However, the input tray surface 30 and feed opening 24 may extend along the same plane.

The input tray 28 may be movably connected to the frame 12 for selective movement between operative and inoperative positions. For example, the input tray 28 may be pivotably or slidably mounted for selective movement with respect to the frame 12. In general, the input tray 28 may have any construction or configuration, and in fact is not a required feature.

The leading laminating pouch 16 and target substrate S received therein may be advanced through the feed opening 24 and through and past the processor to emerge from the discharge opening 26 with the target substrate S adhesively bonded to the laminating sheets 20, 22 of the leading laminating pouch 16. The processor provides a pressing force that acts on the target substrate S and on the laminating sheets 20, 22 of the laminating pouch 16 to affect the desired processing operation, as will be described in greater detail below.

Figure 2:
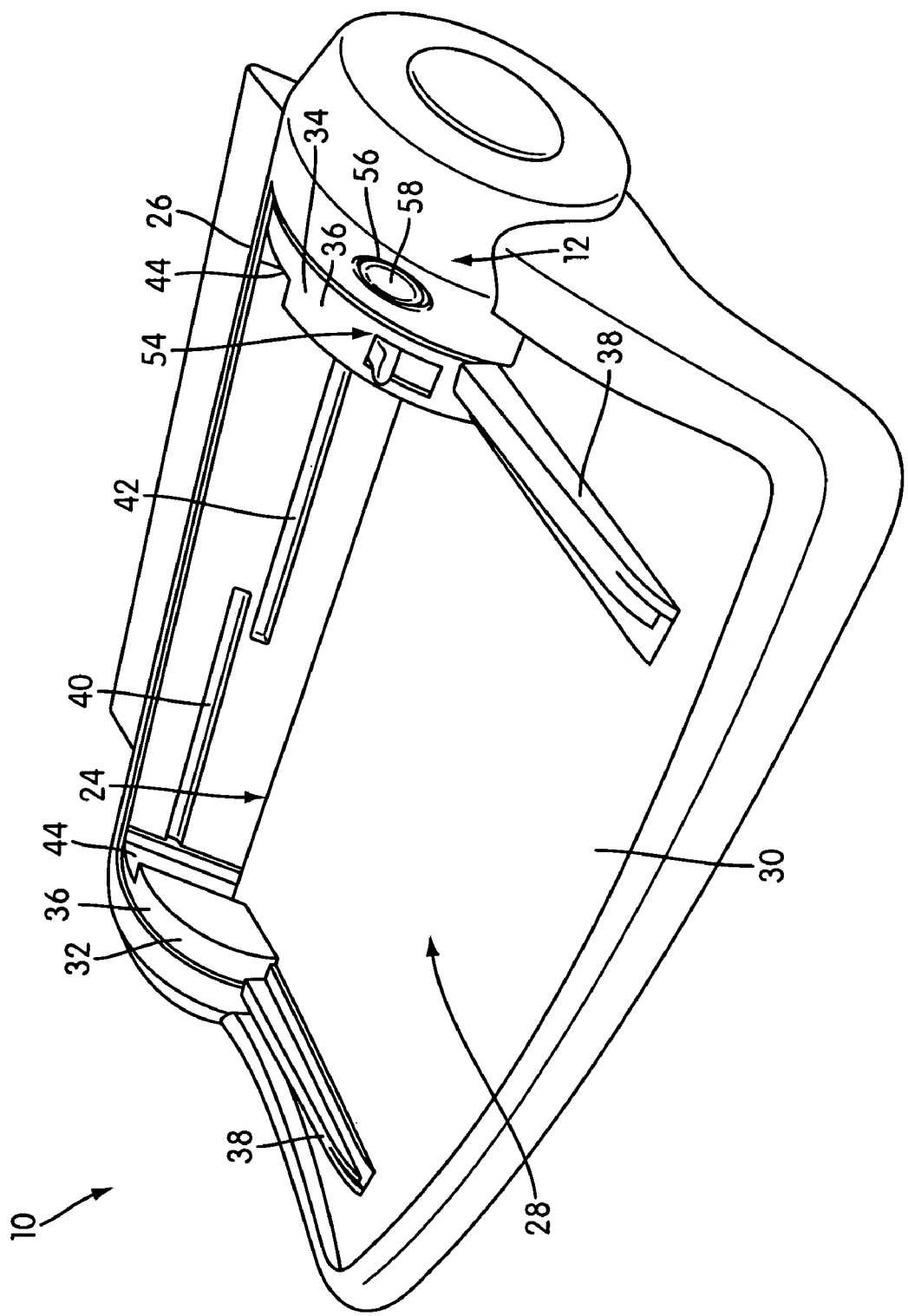
FIG. 2 is a right perspective view of the apparatus shown in FIG. 1.

As best shown in FIGS. 1, 2, and 4, the frame 12 includes cartridge holders 32, 34 structured to releasably secure the cartridge 18 to the frame 12. The cartridge holders 32, 34 are adjustably mounted to the frame 12 such that the cartridge holders 32, 34 can be moved to accommodate different width cartridges 18 that contain different width laminating pouches 16. Each cartridge holder 32, 34 includes a base portion 36 and an arm portion 38. The base portions 36 of the cartridge holders 32, 34 are engaged with corresponding recesses 40, 42 provided in the frame 12. The recesses 40, 42 secure the cartridge holders 32, 34 to the frame 12 and allow sliding movement of the cartridge holders 32, 34 towards and away from one another to adjust the difference therebetween for accommodating different width cartridges 18. For example, the cartridge holders 32, 34 may be positioned at the outer ends of respective recesses 40, 42 for larger width cartridges 18 and the cartridge holders 32, 34 may be positioned at the inner ends of respective recesses 40, 42 for smaller width cartridges 18. Indicia may be provided on the frame 12 to indicate the position of the cartridge holders 32, 34 for accommodating different width cartridges 18. However, the cartridge holders 32, 34 may be mounted to the frame 12 in any other suitable manner. Alternatively, the cartridge holders 32, 34 may be rigidly mounted to the frame 12 to accommodate a single size cartridge 18. Any suitable construction for mounting the cartridge 18 to the frame 12 is envisioned within the scope of the invention.

Figure 6:
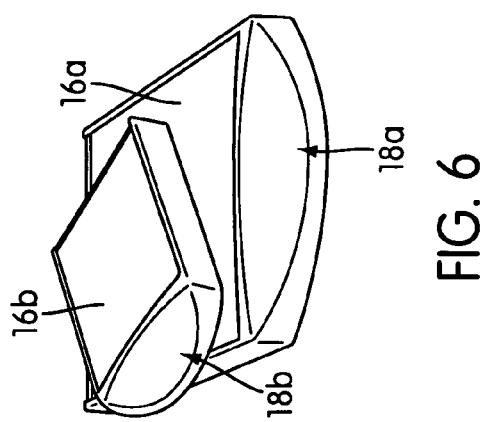
FIG. 6 is a perspective view illustrating embodiments of cartridges containing different size pouches.
Figure 9:
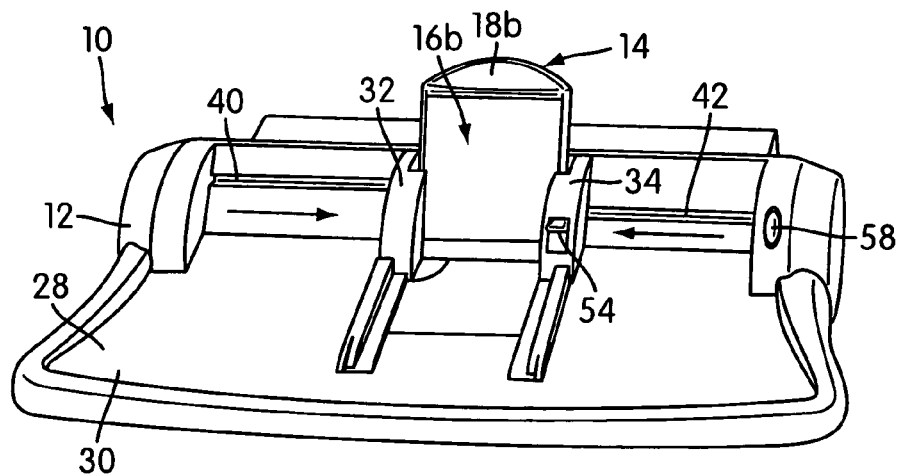
FIG. 9 is a perspective view of the apparatus shown in FIG. 1 with cartridge holders of the apparatus in a position to mount a cartridge containing stacks of pouches of business card size.
Figure 10:
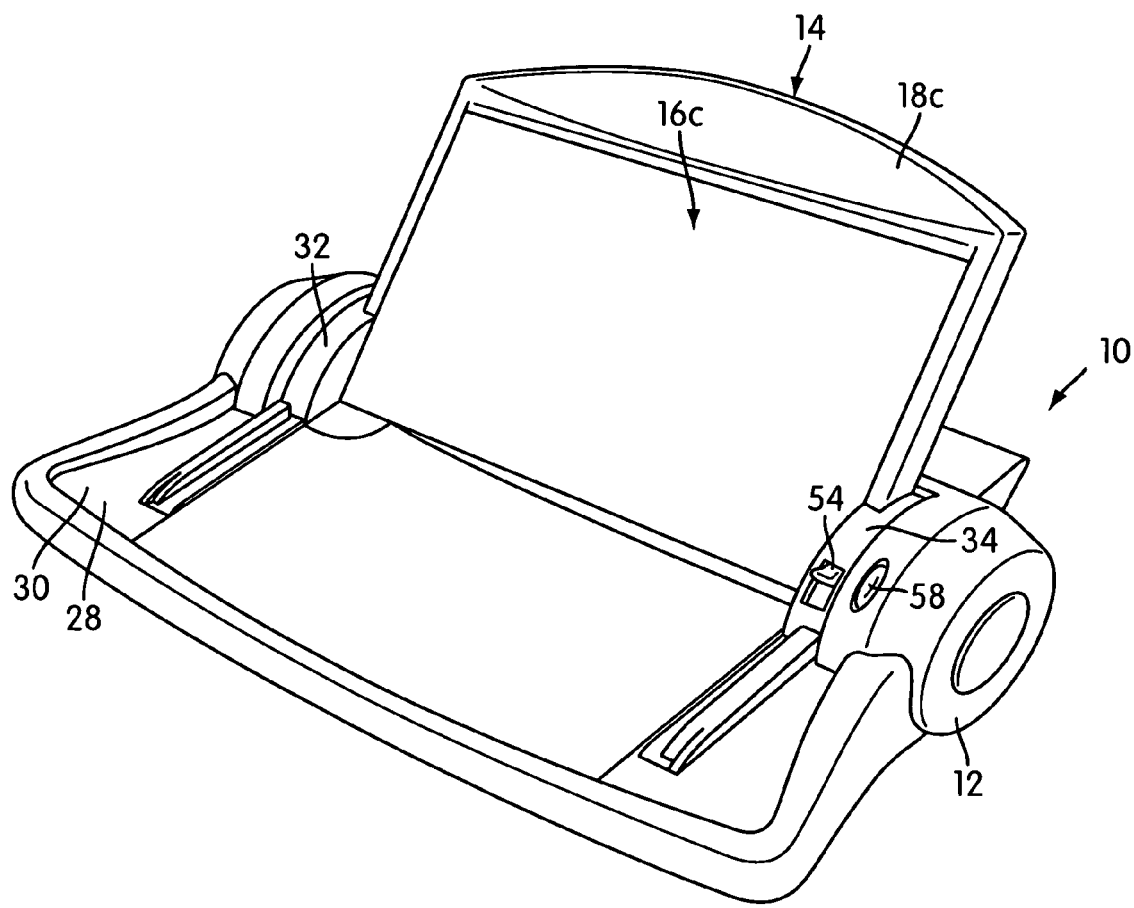
FIG. 10 is a perspective view of the apparatus shown in FIG. 1 with cartridge holders of the apparatus in a position to mount a cartridge containing stacks of pouches of A4 or letter size.

FIG. 6 illustrates two cartridges 18a, 18b of different widths. One cartridge 18a includes photo-size (e.g., 5 inch by 7 inch) laminating pouches 16a and the other cartridge 18b includes smaller business card-size laminating pouches 16b. FIG. 9 illustrates a cartridge 18b having business card-size laminating pouches 16b engaged with the cartridge holders 32, 34 of the frame 12 and FIG. 10 illustrates a cartridge 18c having A4 or letter-size laminating pouches 16c engaged with the cartridge holders 32, 34 of the frame 12.

The cartridge holders 32, 34 are oriented such that a cartridge 18 may be dropped vertically downwardly into the frame 12. Specifically, to mount a cartridge 18 to the frame 12, the cartridge 18 is slidably engaged with track portions 44 provided by the cartridge holders 32, 34. The track portions 44 guide the sides of the cartridge 18 as the cartridge 18 is moved into the frame 12.

A friction roller may be provided adjacent the processor to engage the sheet 20 of leading pouch 16 folded down to the open position so as to urge the leading one of the pouches 16 into the processor. However, any other suitable mechanism or device may be provided to operatively engage the leading one of the pouches 16 of the cartridge 18 with the processor. Also, the user could simply manually push the lead pouch 16 forward into the processor.

The arm portions 38 of the cartridge holders 32, 34 are positioned on the input tray surface 30 and function as an alignment guide to assist in correctly aligning the target substrate S and laminating sheets 20, 22 with the feed opening 24.

The cartridge holders 32, 34 and cartridge 18 may each provide lock structures to releasably secure the cartridge 18 to the cartridge holders 32, 34 of the frame 12. Further, the frame 12 may include an ejector mechanism that is operable to release the cartridge 18 from the cartridge holders 32, 34. For example, the ejector mechanism may include a biasing structure, such as a spring, that may be manually or electrically actuated to urge or eject the cartridge 18 in an outward direction with respect to the frame 12.

In the illustrated embodiment, the laminating pouches 16 are contained within a cartridge 18 to facilitate easy removal and replacement of the laminating pouches 16. However, the frame 12 may be constructed and arranged to removably mount the laminating. pouches 16 arranged in a stack without the use of a cartridge 18. As mentioned above, any type of pouch holder, fixed or removable, may be used.

As best shown in FIG. 13, the cartridge 18 includes a cartridge body 46 constructed from plastic, for example, and structured to be removably mounted to the frame 12. The cartridge body 46 includes cooperating sidewalls 48, 50 that contain the stack of laminating pouches 16 therebetween. The sidewalls 48, 50 of the cartridge body 46 are structured to slidably engage the track portions 44 of the cartridge holders 32, 34 to releasably secure the cartridge 18 to the frame 12.

In the illustrated embodiment, each laminating pouch 16 includes a pair of laminating sheets 20, 22 joined at leading ends thereof and a pressure-sensitive adhesive provided on an inner surface of the laminating sheet 22. The laminating sheets 20, 22 may be made of any material, and may be transparent or translucent laminating films. For example, the laminating sheet 22 could be a polypropylene while the laminating sheet 20 could be a polyester. Also, the laminating sheets 20, 22 may be part of a single sheet folded along a transversely extending fold line. These examples are in no way intended to be limiting.

The laminating sheets 20, 22 may have any shape or configuration. In the illustrated embodiment, that shape is rectangular to accommodate the rectangular shape of standard letter paper, business cards, and photographs, for example. However, the shape of the laminating sheets 20, 22 could be circular, ovoid, triangular, or any other conceivable shape. Further, the laminating sheets 20, 22 need not be identical in shape, although that is preferable.

The pressure-sensitive adhesive used may be of any type, including, but not limited to, a UV cured adhesive, an acrylic based emulsion, hot melt applied, or any other type of adhesive.

A release liner 52 separates the laminating sheets 20, 22 from one another. The release liner 52 includes an outer release surface that engages the adhesive on the laminating sheet 22 (if both sheets of each pouch have adhesive, then both sides of the liner would be release surfaces). The release liner 52 may be made of any suitable material and the release characteristics of the outer release surface may be provided in any way, such as by silicone or wax coating. Where a heat activated adhesive is used, the release liner can be omitted, although it may be desirable to use if the adhesive becomes tacky at a relatively low temperature.

As shown in FIG. 15, the release liner 52 is wider than the laminating sheets 20, 22 in order to contain the laminating pouch 16 within the cartridge 18 and facilitate the unfolding of the sheet 20 of a leading one of the pouches 16 from the other sheet 22. Specifically, the laminating sheets 20, 22 have a width that is substantially equal to the distance between inner edges of the side walls 48, 50 of the cartridge 18. When the laminating pouches 16 are mounted within the cartridge 18, the release liner 52, which is wider than the laminating sheets 20, 22, engages within recesses provided in the side walls 48, 50 of the cartridge 18. For example, the lateral edges of the release liner 52 may engage in tracks 44. As a result, the laminating sheet 20 can be unfolded away from the release liner 52 and the other sheet 22, with the release liner 52 maintaining the other sheet 22 within the cartridge 18, as shown in FIG. 14. The separation of the laminating sheets 20, 22 enables the target substrate S to be positioned in a laminating position between the release liner 52 and the sheet 20.

Figure 5:
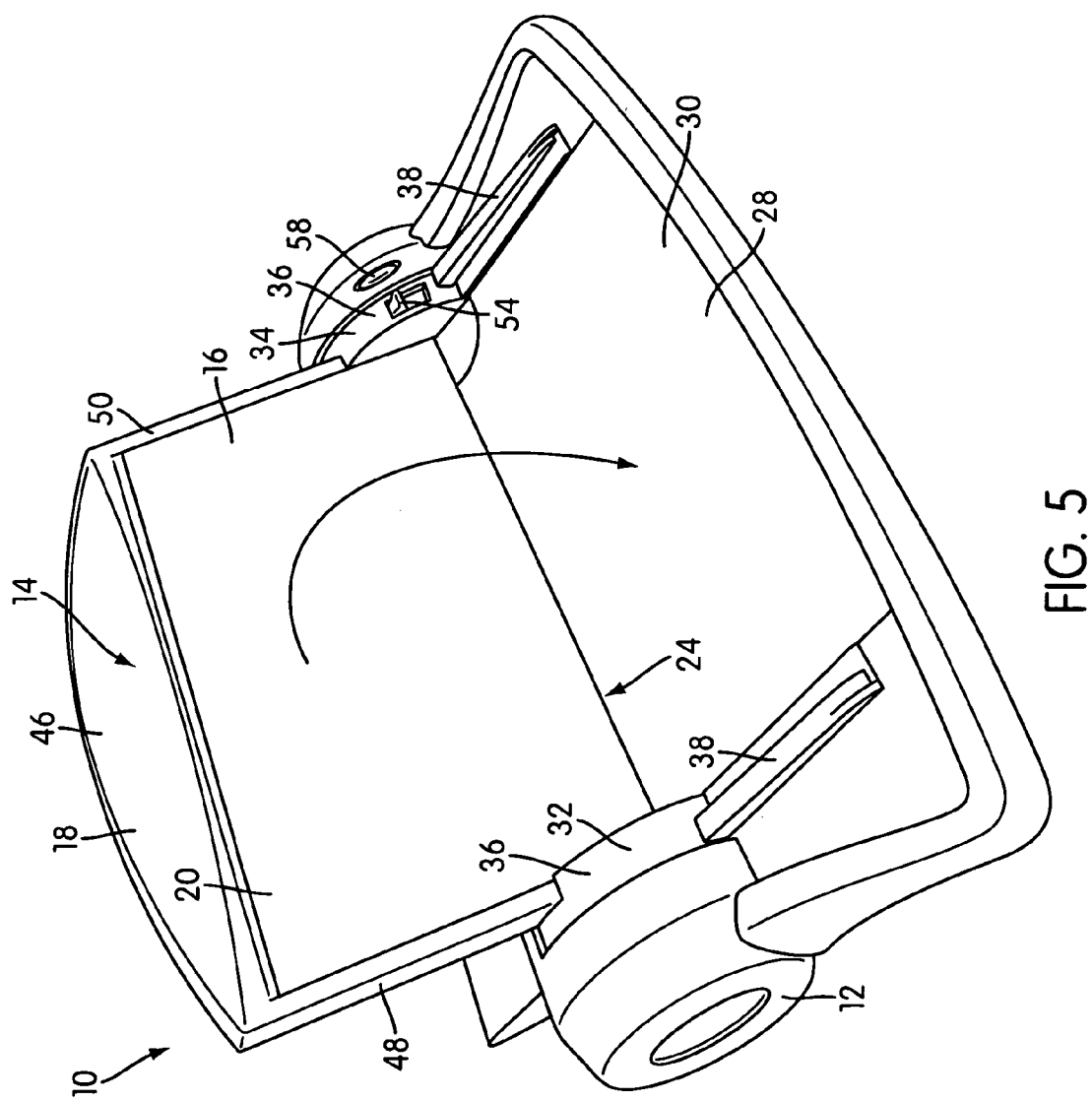
FIG. 5 is a perspective view of the apparatus shown in FIG. 1 with a cartridge removably mounted to the frame that contains a stack of pouches.

The apparatus 10 may include an unfolding mechanism that includes at least one movable portion engagable with the one of the sheets 20 of the leading pouch 16 when the cartridge 18 is mounted to the frame 12 and movable to unfold the one of the sheets 20 of the leading pouch 16 away from the other sheet to open the leading pouch 16 when the cartridge 18 is mounted to the frame 12 for receipt of the target substrate S, as shown in FIG. 5.

For example, as shown in FIGS. 1, 2, and 5, the unfolding mechanism may include an actuator, in the form of a lever 54, for operating the unfolding mechanism to move the at least one movable portion.

In another example, one of the laminating sheets 20 may be constructed of a heavier material than the other of the sheets 22 such that the one sheet 20 unfolds away from the other sheet 22 due to gravity when the cartridge 18 is mounted to the frame 12.

In yet another example, a feature, such as a hinge 64 as shown in FIG. 18, may be molded into the joint that holds the laminating sheets 20, 22 together that causes the one sheet 20 to unfold away from the other sheet 22.

Alternatively, the laminating sheets 20, 22 may be separated by the user's hand, thus avoiding the need for any mechanism for unfolding.

Operation of the apparatus 10 will now be described in greater detail. In the illustrated embodiment, to perform a processing operation, the cartridge holders 32, 34 of the frame 12 are adjusted to the appropriate position and a cartridge 18 containing a stack of laminating pouches 16 is mounted to the cartridge holders 32, 34.

Figure 7:
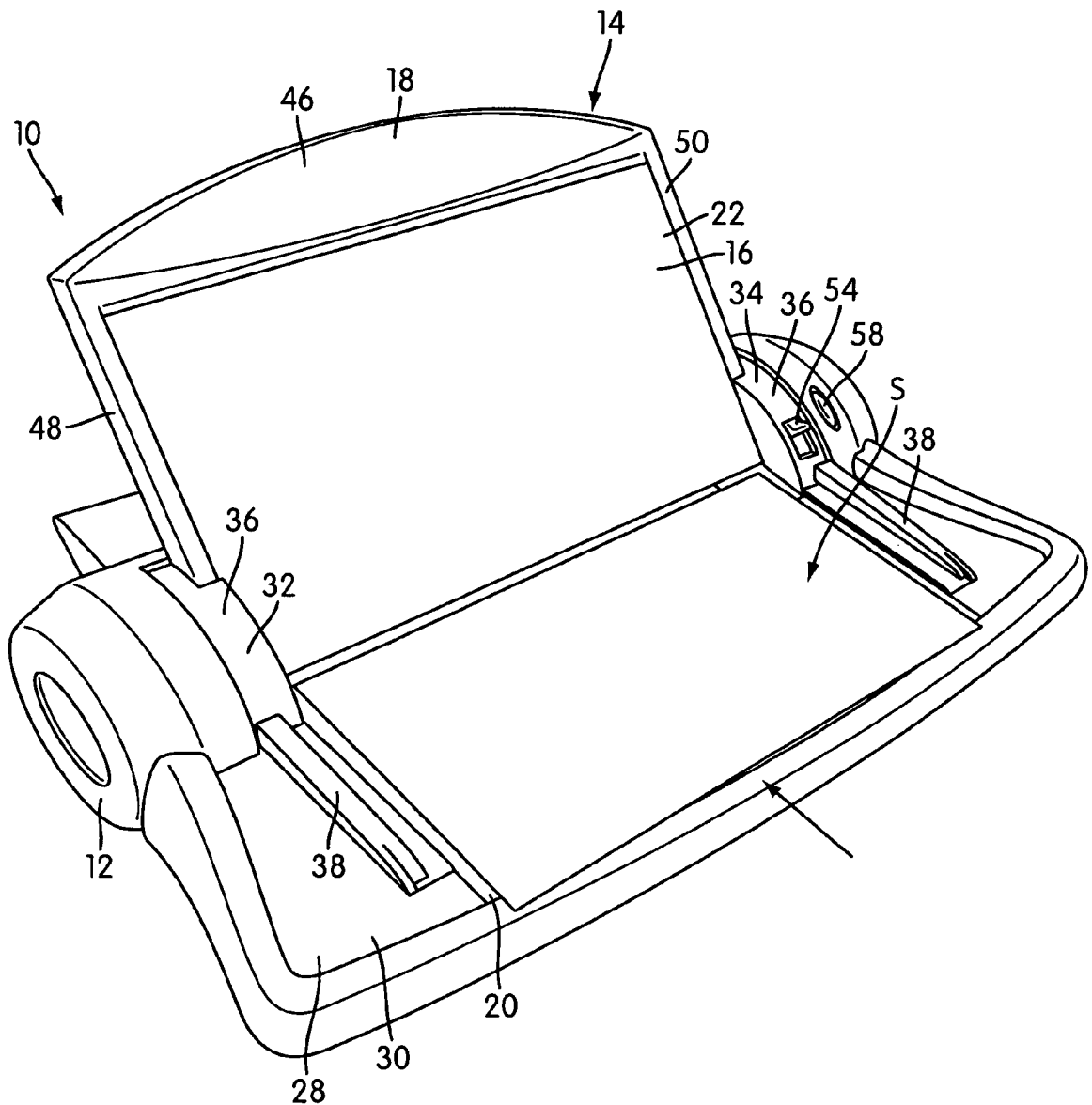
FIG. 7 is a perspective view of the apparatus shown in FIG. 1 with a leading one of the pouches in an open position for receipt of a target substrate.

The unfolding mechanism, such as lever 54, or the user's hand is used to unfold the one of the sheets 20 of the leading pouch 16 away from the other sheet 22 to open the leading pouch 16 into the open position for receipt of the target substrate S, as shown in FIGS. 5 and 12. The sheet 20 rests on the input tray surface 30. The user then places the target substrate S on the sheet 20, as shown in FIG. 7. As an optional feature, the sheet 20 may include an adhesive on the inner surface thereof to help keep the target substrate S in place during the processing operation.

Figure 8:
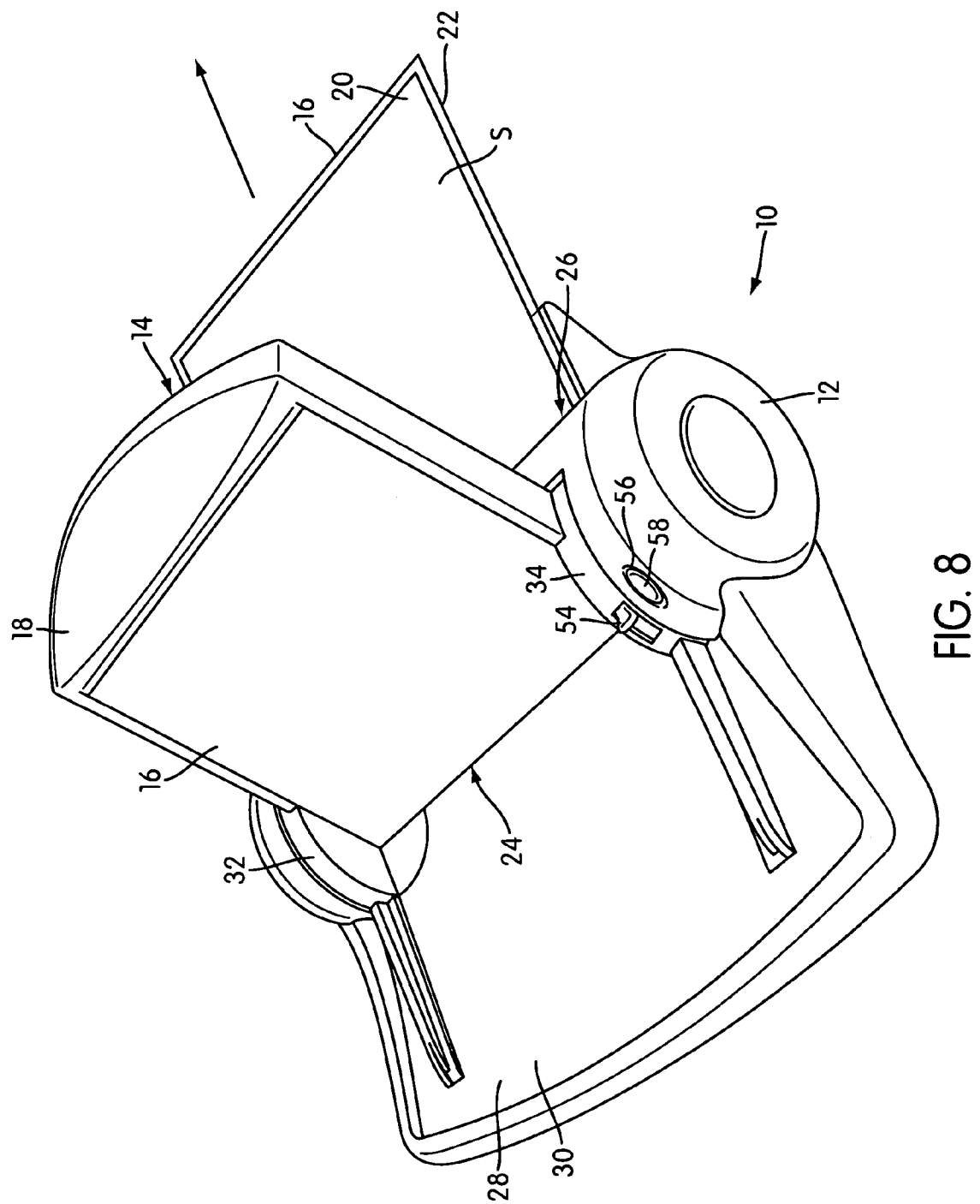
FIG. 8 is a perspective view of the apparatus shown in FIG. 1 with a target substrate exiting a discharge side of the apparatus.

The leading laminating pouch 16 in the open position and the target substrate S received therein are advanced through the feed opening 24 and through and past the processor to emerge from the discharge opening 26 with the target substrate S adhesively bonded to the laminating sheets 20, 22 of the leading laminating pouch 16, as shown in FIG. 8. The final product may be supported at the discharge opening 26 by a substrate supporting surface that is configured to receive and support the final product discharged from the apparatus 10 in a substantially flat condition.

The processor has been configured to press the laminating sheets 20, 22 of the laminating pouch 16 against the opposing sides of the target substrate S and/or to one another so as to affect adhesive bonding between the target substrate S and the laminating sheets 20, 22. For example, it may use conventional nip rollers 66, 68, as shown in FIG. 16.

With respect to the release liner 52, the user may simply remove the liner 52 prior to advancement of the sheets 20, 22 and target substrate S through the processor. Also, the liner 52 may be folded at its lead end as described in U.S. application Ser. No. 10/727,561 to Nordin et al. filed Dec. 5, 2003, the entirety of which is incorporated herein by reference. This will enable the user to progressively withdraw the release liner 52 from between the laminating sheets 20, 22 to allow the laminating sheets 20, 22 adhere to the target substrate S and to one another as the target substrate S and laminating pouch 16 proceed into the processor. The movement of the release liner 52 may be described as a progressive rolling or peeling motion. The bonded laminating sheets 20, 22 and target substrate S exit at the discharge opening 26 of the frame 12, and the release liner 52 remains at the feed opening 24 of the frame 12 for disposal.

As another alternative, the wider part of the liner 52, as shown in FIG. 15, may engage the side walls 48, 50 of the cartridge 18 to prevent its movement along with the pouch 16 as it advances into and through the processor (the sheet behind the liner would be pulled from behind it into the processor along with the other sheet and the target substrate). The release liner 52 left behind is simply disposed of by the user prior to the next processing operation.

In the illustrated embodiment, an actuator 56 is provided to advance the laminating pouch 16 and target substrate S through the processor. As shown in FIG. 2, the actuator 56 may in the form of an electric power switch 58 that is actuated to supply power to the processor for performance of the processing operation. Specifically, an electric motor would be powered to rotate the nip rollers of the processor, and possibly heating elements if used may be heated. The apparatus 10 may include a sensor that senses a target substrate S positioned on the input tray surface 30 and actuates the processor. As shown in the alternative embodiment of FIGS. 11 and 12, which will be discussed below, the actuator 56 may be in the form of a crank handle 60 that is operatively connected with the processor to effect operation thereof. Alternatively, an actuator 56 may not be provided and advancement of the target substrate S and laminating pouch 16 may be affected by manually pulling the target substrate S and laminating pouch 16 through the processor.

Figure 11:
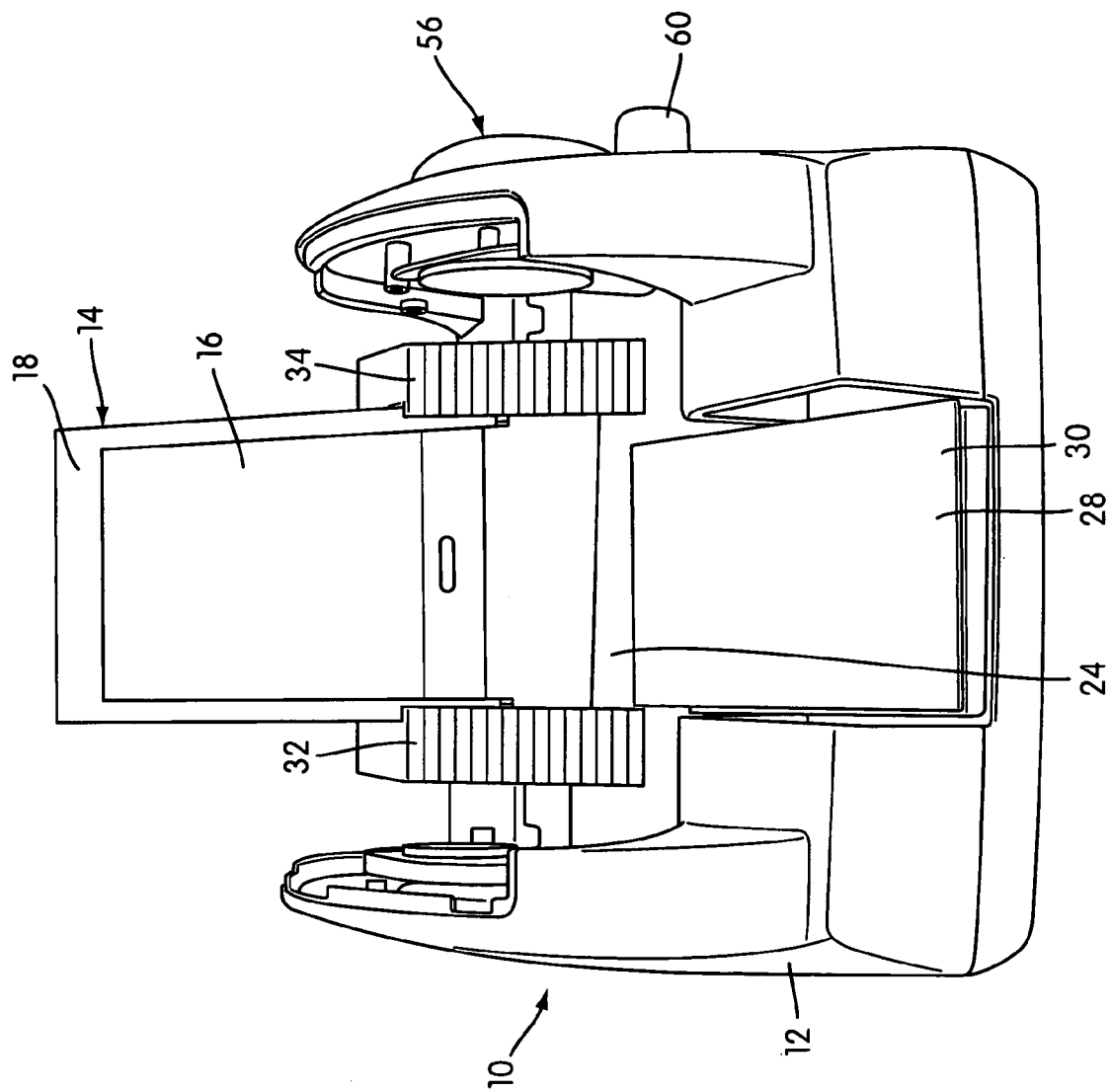
FIG. 11 is a front perspective view of another embodiment of a master processing apparatus with a cartridge containing a stack of pouches being mounted to cartridge holders of the apparatus.

As mentioned above, FIGS. 11 and 12 illustrate an alternative embodiment. This embodiment functions much in the same way as the embodiment discussed above and uses the same cartridge 18. The same reference numerals are used to denote the same structures. The apparatus of FIGS. 11 and 12 is a prototype in which a Xyron 900, Xyron 510 or Xyron EZ Laminator has been modified to receive the cartridge 18, and the existing nip rollers and actuator 56 have been kept for use as the processor. These products are available from Xyron, Inc. of Scottsdale, Ariz. USA.

A feeder may be provided to advance the stack of laminating pouches 16 such that a laminating pouch adjacent the leading laminating pouch becomes the next leading laminating pouch and is positioned successively to enable one of the sheets of the next leading pouch to be unfolded away from the other sheet to open the next leading pouch into the open position for receipt of the target substrate S. As shown in FIG. 17, the feeder may be a resilient structure, such as at least one spring 62, positioned to bias the stack of laminating pouches 16 for advancing the stack in a feeding manner to successively position the pouches as the lead pouch. The feeder may be part of the frame 12 that interacts with the laminating pouches 16 in the cartridge 18 or may be part of the cartridge 18 itself. Alternatively, the cartridge 18 may be oriented such that the pouches are fed to the leading position by use of gravity. Moreover, the construction may be that no feeding is used at all. Instead, as each leading pouch is removed and processed, the next pouch would be exposed and become the leading pouch without moving.

Also, a gauge assembly may be included in the apparatus 10 to provide an indication of the amount of laminating pouches 16 remaining in a cartridge 18. For example, the gauge assembly may provide an electronic signal, such as a flashing LED, that indicates that a limited number of laminating pouches 16 remains in the cartridge 18.

The adhesive present on at least one of the laminating sheets 20, 22 may be a heat-activated type adhesive. In this case, the processor may include heating elements that are powered by a power source to emit heat at a predetermined temperature to effectively activate the adhesive. It is noted that for certain application, the adhesive present on the at least one of the laminating sheets may also be an adhesive that does not require heat to increase adherence properties thereof. In this case, the heating elements may not be heated by the power source. The processor may have any construction suitable for heating the laminating sheets and applying pressure to them. For example, the processor may use heat platens, heated rollers, a combination of these, or any suitable heating elements for applying heat to the laminating sheets. Likewise, the processor may use an arrangement of rollers, fixed or passive roller bearing structures, or any other suitable structures for applying pressure to the laminating sheets.

The heating elements may be controllable between various relative temperatures to accommodate different laminating sheet thicknesses and materials. Also, the processor may be operated at various speeds to impart the desired adhesion properties. Likewise, the pressure applied by the processor to the laminating pouch and target substrate may be varied. The apparatus 10 may include a control system to set one or more operating parameters of the processor to the specific requirements of the laminating materials 20, 22 and target substrate S. For example, such parameters may include the feed rate of the laminating materials 20, 22 and target substrate S, temperature of the heating elements, and pressure of the processor.

Further details and embodiments of processing apparatuses are disclosed in U.S. application Ser. No. 10/146,144 to Velasquez et al., the entirety of which is herein incorporated by reference.

In alternative embodiments, the supply of pouches need not be arranged in a stack. For example, the pouches could be arranged in end to end relation on a supply roll. One way to do this would be to provide a continuous backing sheet or liner and arrange the pouches on the liner in end to end relation. The backing sheet would be fed into the processor and rotation of the nip rollers in the apparatus processor could simultaneously serve to bond the sheets of the leading pouch over the target substrate, while advancing the next pouch into the operative or ready position on an input tray whereby that pouch is exposed as the leading pouch and can be opened for receipt of the target substrate. Adjacent pouches may be spaced sufficiently to allow the pouch being processed to clear the processor while the next one remains upstream of the processor ready to receive the target substrate. As another alternative, the pouches could be joined together end to end with a perforated line between the trailing and leading edges of adjacent pouches. As each lead pouch is fed into the processor it can be broken away from the successive one, and then the successive one can be fed by power or manually into the operative or ready position.

In general, any suitable structure may be used as the pouch holder and may hold the pouches in any format.

Also, the laminating pouch 16 may be used for other applications and in other contexts. For example, the laminating pouch 16 could be modified for use as a magnet making device (one sheet being a flexible magnetized sheet and the other being a laminating film or an aggressive or non-aggressive mask) or an adhesive transfer device (one sheet being an adhesive coated release liner and the other being an aggressive or non-aggressive mask). Further details and embodiments of pouches are disclosed in U.S. application Ser. No. 10/727,561 to Nordin et al., the entirety of which is herein incorporated by reference.

It can thus be appreciated that the aspects of the present invention have been fully and effectively accomplished. The foregoing specific embodiments have been provided to illustrate the structural and functional principles of the present invention, and are not intended to be limiting. To the contrary, the present invention is intended to encompass all modifications, alterations, and substitutions within the spirit and scope of the appended claims.

What is claimed is:

1. A supply for a master processing apparatus operable to affect adhesive bonding between sheets of a pouch to a target substrate, the apparatus comprising: (a) a frame and (b) a processor operable to perform a processing operation wherein adhesive bonding is affected between the sheets of a pouch and a target substrate received therein as they are moved through the processor in a feeding direction, the supply comprising:

a removable pouch holder constructed to be removably mounted to the frame of the apparatus; and a plurality of pouches arranged in the pouch holder, each pouch including a pair of sheets joined at leading ends thereof and adhesive provided on an inner surface of at least one of the sheets;

the pouch holder being configured to enable the pouches to be successively exposed as a leading pouch in an operative position wherein one of the sheets of the leading pouch can be unfolded away from the other sheet to open the leading pouch into an open position for receipt of the target substrate, and thereafter the leading pouch with the target substrate can be fed into the processor for performance of the processing operation.

2. A supply according to claim 1, wherein the pouch holder enables the supply to be advanced in a feeding manner to move successive leading pouches into the operative position as each previous leading pouch is fed into the processor.

3. A supply according to claim 2, wherein the pouches are laminating pouches with the sheets being laminating sheets.

4. A supply according to claim 2, wherein the pouches are arranged in a stack in the pouch holder.

5. A supply according to claim 4, wherein the pouch holder further comprises a feeder for advancing the stack of pouches in the feeding manner.

6. A supply according to claim 5, wherein the feeder is a resilient structure positioned to bias the stack of pouches for advancing the stack.

7. A supply according to claim 6, wherein the resilient structure includes at least one spring.

8. A supply according to claim 4, wherein the pouch holder is a cartridge.

9. A supply according to claim 8, wherein the cartridge comprises a feeder for advancing the stack of pouches in the feeding manner.

10. A supply according to claim 9, wherein the feeder is a resilient structure positioned to bias the stack of pouches for advancing the stack.

11. A supply according to claim 10, wherein the resilient structure includes at least one spring.

12. A master processing apparatus for performing a master processing operation on a target substrate, the apparatus comprising:

a frame;

a pouch holder mounted to the frame;

a supply including a plurality of pouches arranged in the pouch holder, each pouch including a pair of sheets joined at leading ends thereof and adhesive provided on an inner surface of at least one of the sheets;

the pouch holder enabling the pouches of the supply to be successively exposed as a leading pouch in an operative position wherein one of the sheets of the leading pouch can be unfolded away from the other sheet to open the leading pouch into an open position for receipt of the target substrate; and a processor operable to perform a processing operation wherein adhesive bonding is affected between the sheets of the leading pouch and the target substrate received therein as they are moved through the processor in a feeding direction.

13. An apparatus according to claim 12, wherein the pouches are laminating pouches with the sheets being laminating sheets.

14. An apparatus according to claim 12, further comprising an unfolding mechanism including at least one movable portion engageable with the one of the sheets of the leading pouch and movable to unfold the one of the sheets of the leading pouch away from the other sheet to open the leading pouch for receipt of the target substrate.

15. An apparatus according to claim 14, wherein the unfolding mechanism includes an actuator for operating the unfolding mechanism to move the at least one movable portion.

16. An apparatus according to claim 15, wherein the actuator is a lever.

17. A master processing apparatus according to claim 12, wherein the pouch holder enables the supply to be advanced in a feeding manner to move successive leading pouches into the operative position as each previous leading pouch is fed into the processor.

18. An apparatus according to claim 17, further comprising an unfolding mechanism including at least one movable portion engageable with the one of the sheets of the leading pouch and movable to unfold the one of the sheets of the leading pouch away from the other sheet to open the leading pouch for receipt of the target substrate.

19. An apparatus according to claim 18, wherein the unfolding mechanism includes an actuator for operating the unfolding mechanism to move the at least one movable portion.

20. An apparatus according to claim 19, wherein the actuator is a lever.

21. An apparatus according to claim 20, wherein the frame includes an input tray surface positioned to support the one sheet of the leading pouch when unfolded into the open position of the leading pouch.

22. A master processing apparatus according to claim 17, wherein the pouches are arranged in a stack in the pouch holder.

23. An apparatus according to claim 22, further comprising a feeder for advancing the stack of pouches in the feeding manner.

24. An apparatus according to claim 23, wherein the feeder is a resilient structure positioned to bias the stack of pouches for advancing the stack.

25. An apparatus according to claim 24, wherein the resilient structure includes at least one spring.

26. An apparatus according to claim 22, wherein the pouch holder is a cartridge removably mounted to the frame and containing the stack of pouches, the cartridge being removable to enable replacement thereof.

27. An apparatus according to claim 26, wherein the cartridge comprises a feeder for advancing the stack of pouches in the feeding manner.

28. An apparatus according to claim 27, wherein the feeder is a resilient structure positioned to bias the stack of pouches for advancing the stack.

29. An apparatus according to claim 28, wherein the resilient structure includes at least one spring.

30. An apparatus according to claim 22, further comprising an unfolding mechanism including at least one movable portion engageable with the one of the sheets of the leading pouch and movable to unfold the one of the sheets of the leading pouch away from the other sheet to open the leading pouch for receipt of the target substrate.

31. An apparatus according to claim 30, wherein the unfolding mechanism includes an actuator for operating the unfolding mechanism to move the at least one movable portion.

32. An apparatus according to claim 31, wherein the actuator is a lever.

33. An apparatus according to claim 32, wherein the frame includes an input tray surface positioned to support the one sheet of the leading pouch when unfolded into the open position of the leading pouch.

* * * * *